(12) United States Patent
Bichler

(10) Patent No.: US 9,664,327 B2
(45) Date of Patent: May 30, 2017

(54) DEVICE FOR REHABILITATING PIPELINES

(75) Inventor: Andreas Bichler, Tirol (AT)

(73) Assignee: TRELLEBORG PIPE SEALS DUISBURG GMBH (DE)

( * ) Notice: Subject to any disclaimer, the term of this patent is extended or adjusted under 35 U.S.C. 154(b) by 488 days.

(21) Appl. No.: 14/112,766

(22) PCT Filed: Apr. 19, 2012

(86) PCT No.: PCT/EP2012/057141
§ 371 (c)(1),
(2), (4) Date: Jan. 8, 2014

(87) PCT Pub. No.: WO2012/143431
PCT Pub. Date: Oct. 26, 2012

(65) Prior Publication Data
US 2014/0110006 A1    Apr. 24, 2014

Related U.S. Application Data

(60) Provisional application No. 61/477,298, filed on Apr. 20, 2011.

(30) Foreign Application Priority Data

Apr. 20, 2011   (DE) .......................... 10 2011 007 826

(51) Int. Cl.
*F16L 55/10*       (2006.01)
*F16L 55/1645*     (2006.01)
(Continued)

(52) U.S. Cl.
CPC ............ *F16L 55/1645* (2013.01); *E03F 3/06* (2013.01); *F16L 55/179* (2013.01); *F16L 55/40* (2013.01)

(58) Field of Classification Search
CPC ............................. F16L 55/1645; F16L 55/40
(Continued)

(56) References Cited

U.S. PATENT DOCUMENTS 4,557,327 A * 12/1985 Kinley ................ E21B 17/1021
166/172
5,309,947 A *  5/1994 Hinger ...................... E03F 3/06
118/306

(Continued)

FOREIGN PATENT DOCUMENTS

AT          406937 B      3/2000
DE     102004059892       6/2006
(Continued)

OTHER PUBLICATIONS

Machine Translation of DE 102004059892.*
International Search Report & Written Opinion, Jul. 18, 2012, for PCT/EP2012/057141.

*Primary Examiner* — Vishal Pancholi
(74) *Attorney, Agent, or Firm* — Dickinson Wright PLLC

(57) ABSTRACT

The invention relates to a device for rehabilitating pipelines, having a support structure (10) to which functional units of the device can be fastened, wherein the support structure (10) has at least two support structure elements (12, 16, 19) which reconnected to one another via at least one buckling mechanism (20). By means of the buckling mechanism (20), at least one support structure element (12, 16, 19) can be placed into a buckled position. Furthermore, an actuating device (30) is provided which is designed such that the buckling mechanism (20) can be placed into a buckling enable position and a buckling blocking position by means of the actuating device (30).

14 Claims, 4 Drawing Sheets

(51) Int. Cl.
*F16L 55/40* (2006.01)
*E03F 3/06* (2006.01)
*F16L 55/179* (2006.01)

(58) Field of Classification Search
USPC .................................................. 138/97, 98
See application file for complete search history.

(56) References Cited

U.S. PATENT DOCUMENTS

| | | | |
|---|---|---|---|
| 6,035,786 | A | 3/2000 | McKay |
| 6,123,027 | A * | 9/2000 | Suyama ................ F16L 55/28 104/138.2 |
| 6,520,719 | B1 | 2/2003 | Tweedie et al. |
| 7,812,328 | B2 * | 10/2010 | Betz ..................... B01J 19/123 104/138.2 |
| 2005/0092382 | A1 * | 5/2005 | Muhlin ................ F16L 55/179 138/98 |
| 2008/0098834 | A1 * | 5/2008 | Sergoyan ............... F16L 55/32 73/866.5 |

FOREIGN PATENT DOCUMENTS

| | | |
|---|---|---|
| EP | 1519100 | 3/2005 |
| WO | WO 97/14903 A2 | 4/1997 |

* cited by examiner

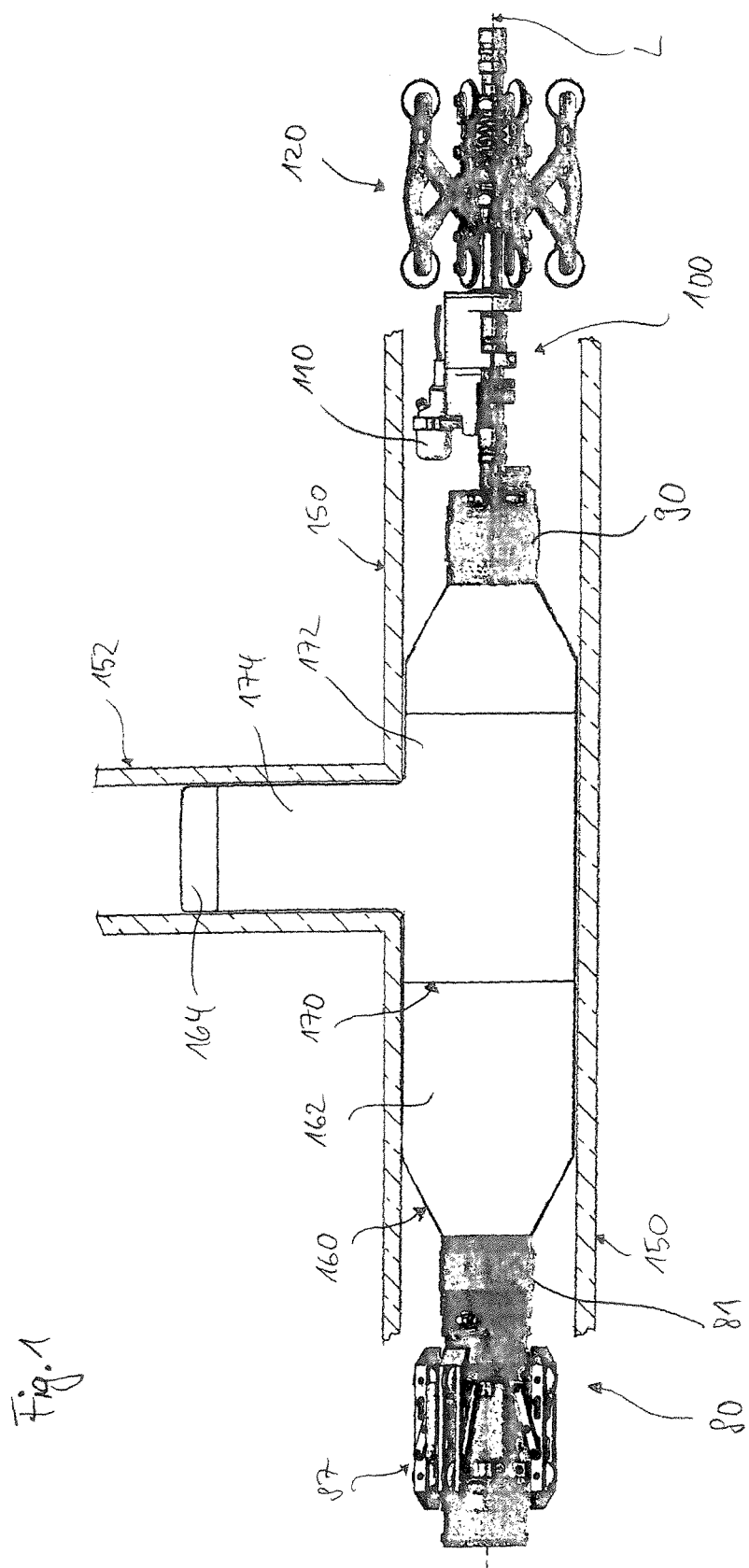

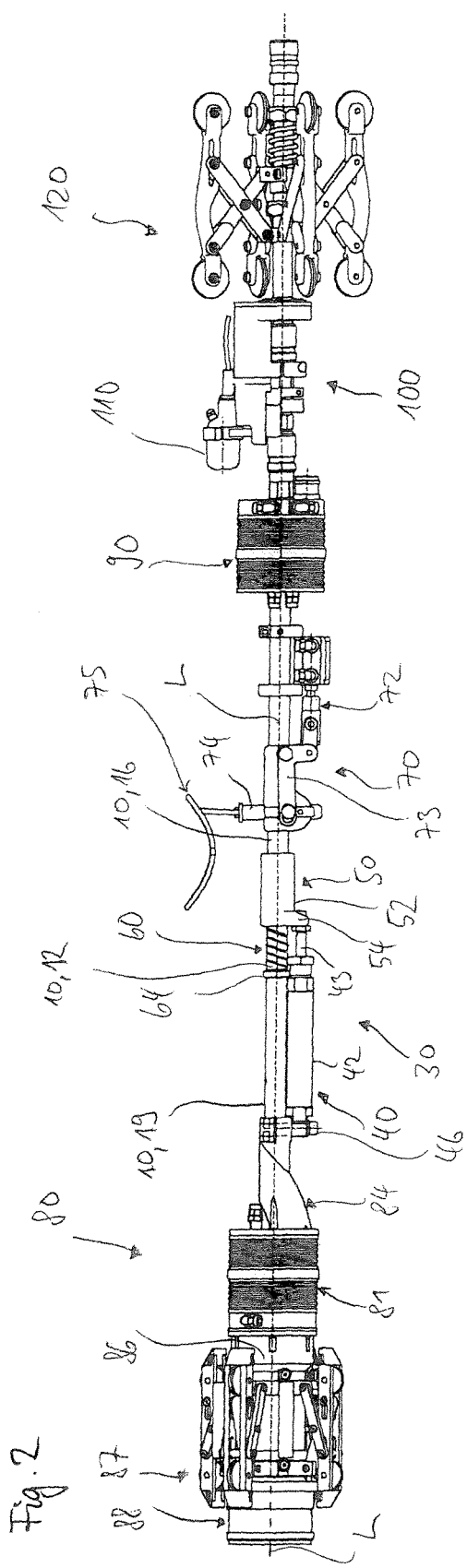

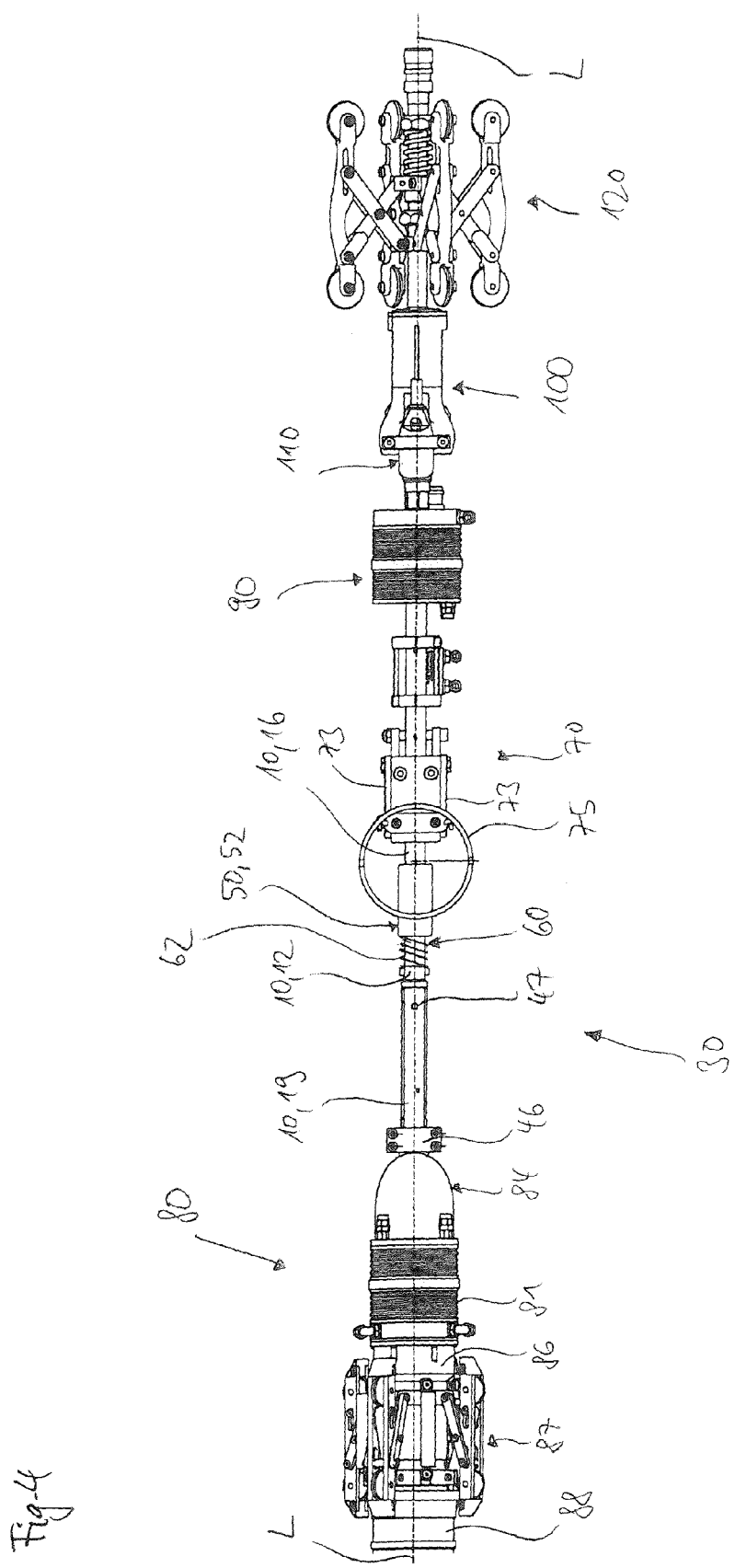

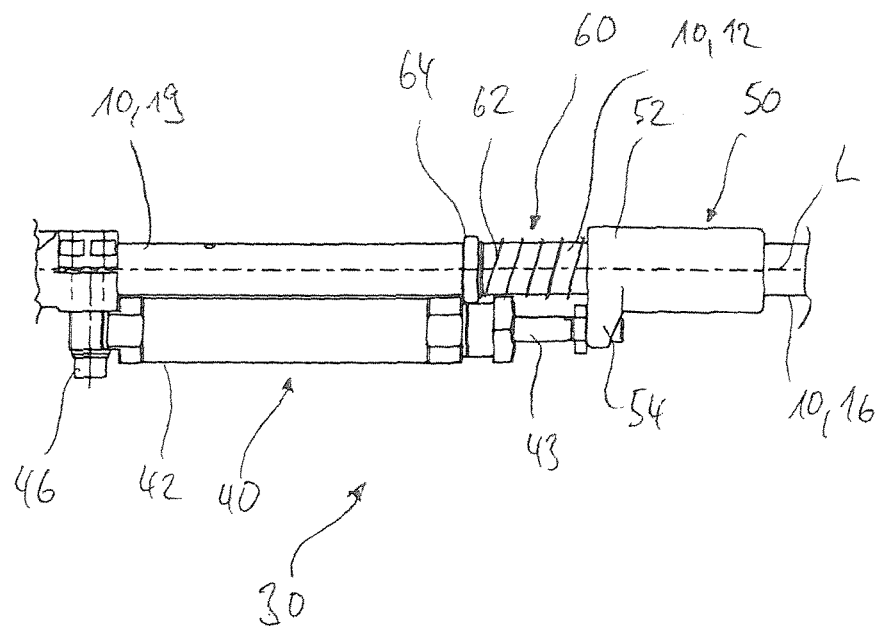
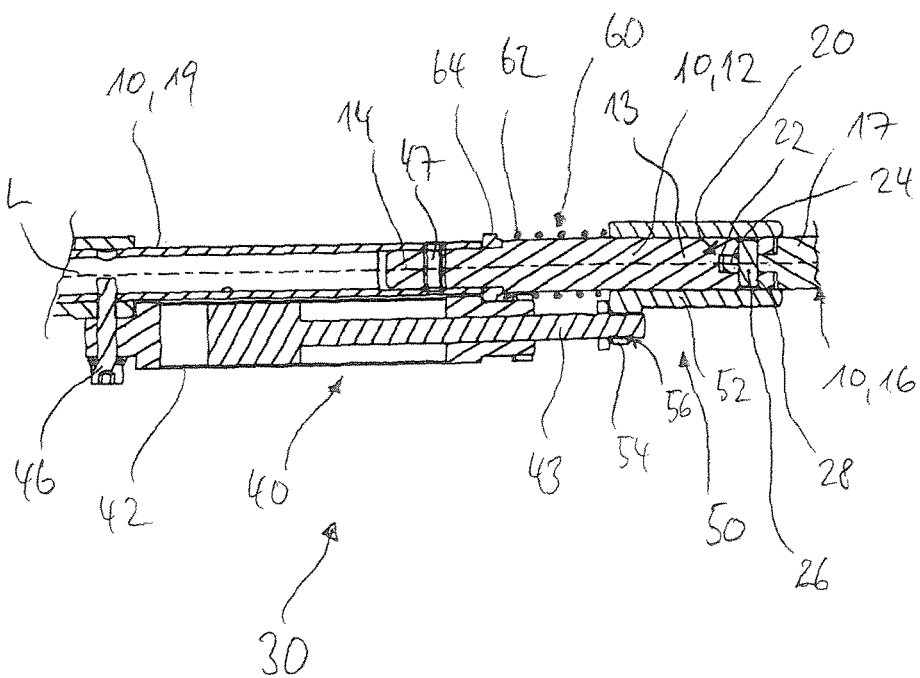

DEVICE FOR REHABILITATING PIPELINES

CROSS REFERENCE TO RELATED APPLICATIONS

The present application is a 35 U.S.C. §371 national stage filing of International Patent Application No. PCT/EP2012/057141, filed Apr. 19, 2012, and through which priority is claimed to German Patent Application No. 10 2011 007 826.6, filed Apr. 20, 2011, and U.S. Provisional Application 61/477,298, filed Apr. 20, 2011, the disclosures of which are incorporated herein by reference in their entireties.

The present invention relates to a device for rehabilitating pipelines. Said device comprises a support structure to which functional units of the device can be fastened. The support structure has at least two support structure elements which are connected to one another via at least one buckling mechanism. By means of the buckling mechanism, at least one support structure element can be placed into a buckled position.

Such devices for rehabilitating pipelines are used in sewerage applications and also in buildings applications. It is sought in particular to rehabilitate main lines, lateral lines, in particular service pipes to houses, and the connecting regions thereof. Leaks and/or cracks often occur at said connecting regions in particular. By introducing a lining element, it is possible to repair leaking sections of lines and in particular of line connection regions. During the rehabilitation process, a lining element for permanently connecting to the inner side of the pipe wall is provided with an adhesive, in particular with a hardenable resin. The lining element preferably comprises a layer of resin-absorbable material, in particular a nonwoven or fibrous material. The device for rehabilitating pipelines, as mentioned in the introduction, is used to bring the lining element to the desired location to be rehabilitated. After the positioning and attachment of the lining element at the location to be rehabilitated, and after the hardening of the resin, the lining element is connected in a positively locking and non-positively locking manner to the pipe inner wall.

A conventional device for rehabilitating pipelines, often also referred to as a packer is known from EP 1 519 100 B1. The packer disclosed in said document comprises a support structure in the form of an elongate packer rod to which the functional units of the rehabilitation device are fastened. Owing to the long overall extent of the packer, it is difficult, in particular in the case of restricted spatial conditions in a shaft and in the case of narrow pipe diameters, to introduce the rehabilitation device via the shaft into the pipeline connected thereto.

U.S. Pat. No. 6,520,719 B1 discloses a device for rehabilitating pipelines, which device comprises a support structure with a two-part base plate. Attached to each of the two plate parts are sliding rails such that the rehabilitation device can be pulled through the duct to be rehabilitated. The two plate parts are connected to one another by means of a joint such that one of the plate parts can be placed into a buckled position. There is however the disadvantage here that the support structure elements may also pass into a buckled position when this is not desired, for example when being lowered into or raised out of a shaft. There is also an increased risk of injury here.

The invention is based on the object of specifying a device for rehabilitating pipelines having a buckling mechanism, wherein it is ensured that the buckling mechanism is used only under certain conditions.

To achieve said object, a device for rehabilitating pipelines as per claim 1 is proposed. Preferred refinements are specified in claims 2 to 10.

The device according to the invention for rehabilitating pipelines may also be referred to in the present case as a rehabilitation device or packer. The support structure forms a solid base and extends preferably substantially along a longitudinal direction corresponding substantially to the longitudinal axis of the pipeline. Within the context of the present invention, the "functional unit" is to be understood in particular to mean those devices, units or devices which are provided for carrying out the rehabilitation process for the rehabilitation device.

To achieve the object mentioned above, in the case of a device for rehabilitating pipelines of the type mentioned in the introduction, it is proposed that an actuating device be provided which is designed such that the buckling mechanism can be placed into a buckling enable position and a buckling blocking position by means of the actuating device. In this way, it is possible by means of the actuating device to determine in a targeted and controlled manner when and/or under what conditions the buckling mechanism is used. It is thereby possible to ensure that the buckling enable position is first assumed at a certain, suitable moment during the insertion or removal of the rehabilitation device into or from a shaft. This makes the rehabilitation device easier to handle overall, and reduces the risk of injury. It is also possible in this way to ensure that, during the movement of the rehabilitation device in the pipeline, the buckling mechanism is in the buckling blocking position and remains there.

In a preferred embodiment, the actuating device has a drive device. The drive device is preferably a linear drive. It is furthermore preferable for the drive device to comprise a pneumatic, hydraulic, electric and/or magnet-operated drive. Combinations of these different drive variants are thus also possible. It is furthermore preferable for the drive device to comprise a displaceable cylinder. For this purpose, use is preferably made of a pneumatic cylinder or a hydraulic cylinder. The abovementioned embodiments of the drive device as a linear drive, preferably as a pneumatic cylinder, have a substantially elongate shape and can therefore be easily integrated into the elongate structure of the rehabilitation device. To be able to realize a supply and/or discharge of a fluid medium, the drive device may have at least one connection and at least one line. For the displaceable cylinder, a single-acting cylinder or a double-acting cylinder may be used. Said cylinder is preferably a double-acting cylinder with magnet piston. Furthermore, the drive device may be provided with a locking unit.

In a further preferred embodiment, the actuating device has a blocking element which can be placed into an enable position in order to enable the buckling mechanism and can be placed into a blocking position in order to block the buckling mechanism. The blocking element is preferably a displaceable sleeve. Such a sleeve may surround the support structure element, as a result of which a space-saving arrangement is possible. This is advantageous in particular in conjunction with the use of bar elements as support structure elements, wherein the sleeve can surround the bar element.

The blocking element is preferably operatively connected to the drive device. For this purpose, it may for example be provided that a piston rod of a pneumatic cylinder is fixedly connected to the blocking element. In this way, the blocking element can be moved from the blocking position into the enable position and vice versa by means of the actuating device.

In a further preferred refinement, the actuating device comprises a spring unit which preloads the blocking element into the blocking position. In this way, the buckling blocking position can be set as a normal position for the actuating device by means of the preload.

In a preferred embodiment of the buckling mechanism, a first end of a first support structure element has a groove and a first end of a second support structure element has a tongue, wherein the groove and tongue are rotatably connected to one another by means of a bolt so as to form the buckling mechanism. It is preferable for only one groove and only one tongue to be provided, such that a simple embodiment of the buckling mechanism is attained.

Bar elements are preferably provided as support structure elements. Such bar elements have an elongate shape which is well suited to the spatial conditions in a pipeline. Alternatively or in addition, other elements such as for example plates, struts, frames or the like may also be provided for the support structure and/or the support structure elements.

The device according to the invention for rehabilitating pipelines will be explained in more detail below on the basis of the appended drawings, in which, in each case schematically:

FIG. 1 shows a schematic view of the device according to the invention for rehabilitating pipelines, with a lining element and a calibration hose being schematically indicated;

FIG. 2 shows a schematic view of the device according to the invention for rehabilitating pipelines as per FIG. 1, without the lining element and the calibration hose being illustrated, and with the actuating device being schematically illustrated;

FIG. 3 shows a longitudinal section along the longitudinal axis, and parallel to the plane of the drawing, of the device according to the invention as per FIG. 2;

FIG. 4 shows a view of the device shown in FIG. 2 from above;

FIG. 5 shows an enlarged view of the actuating device shown in FIG. 2, and

FIG. 6 shows a longitudinal section along the longitudinal axis, and parallel to the drawing plane, through the illustration as per FIG. 5.

FIGS. 1 to 4 schematically illustrate an embodiment of a device according to the invention for rehabilitating pipelines, wherein in FIG. 1, the device is provided with a calibration hose 160 and a lining element 170. Also illustrated in FIG. 1, as pipelines, are a main pipe 150 and a lateral pipe 152 in the form of a service pipe to a house. In contrast to FIG. 1, the calibrating hose 160 and the lining element 170 and also the two pipelines 150, 152 have been omitted in FIGS. 2 to 4. The calibration hose 160 is connected in an air-tight manner to connection devices 80, 90 which will be explained in more detail further below. The calibration hose 160 comprises two portions, specifically a main pipe calibration hose 162 and a lateral pipe calibration hose 164. The lining element 170 attached to the outer side of the calibration hose 160 likewise comprises two portions, specifically a main pipe portion 172 and a lateral pipe portion 174. The situation illustrated in FIG. 1 is the final phase of a rehabilitation process in which the rehabilitation device according to the invention is used. In said situation, the calibration hose 160 is in the inflated state, as indicated in FIG. 1, and by means of its main pipe calibration hose 162, presses the main pipe portion 172 against the inner wall of the main pipe 150, and by means of its lateral pipe calibration hose 164, presses the lateral pipe portion 174 against the inner wall of the lateral pipe 152. The lining element 170 comprises a layer of resin-absorbable material, and in the state shown in FIG. 1, is impregnated with a resin, which hardens. After the resin has adequately hardened, the air is removed from the calibration hose 160 and the rehabilitation device can be deployed out of the main pipe 150 and removed via a shaft.

As already explained in the introduction, the calibration hose 160 and the lining element 170 have been omitted in FIGS. 2 to 4, such that all the main constituent parts of the rehabilitation device can be seen. Said FIGS. 2 to 4 and the detail illustrations as per FIGS. 5 and 6 will be discussed in greater detail below.

The rehabilitation device comprises a support structure to which all the main functional units of the rehabilitation device are fastened. As main functional units, FIGS. 2 to 4 illustrate a buckling mechanism 20, an actuating device 30, a lifting mechanism 70, a first connection device 80, a second connection device 90, a rotary drive 100 and a camera 110.

In the present exemplary embodiment, the support structure 10 comprises a first support structure element 12 with a first end 13 and a second end 14 and also a second support structure element 16 with a first end 17 and a second end 18. The rotary drive 100 is connected to the second end 18 of the second support structure element 16 in order to permit a rotation of the support structure 10 about the longitudinal axis L. The support structure 10 furthermore comprises a third support structure element 19 which is connected to the second end 14 of the first support structure element 12. Also connected to the rotary drive 100 is a further support structure element on which a travelling unit 120, explained in more detail further below, is arranged.

FIGS. 3 and 6 in particular show the buckling mechanism 20 which connects the first support structure element 12 and the second support structure element 16 to one another. By means of said buckling mechanism 20, at least one of the support structure elements 12, 16 can be placed into a buckled position. In said buckled position, it is for example the case that the first support structure element 12 and the other elements of the supporting structure and functional units fastened thereto extend at an angle relative to the longitudinal axis L. The design of the buckling mechanism 20 can be seen from FIG. 6. According to said figure, the first end 13 of the first support structure element 12 has a groove 22 and the first end 17 of the second support structure element 16 has a tongue 24, wherein the groove 22 and the tongue 24 are rotatably connected to one another by means of a bolt 26. The bolt extends along an opening 28 in a direction substantially perpendicular to the longitudinal axis A.

Furthermore, the actuating device 30 is designed such that the buckling mechanism 20 can be placed into a buckling enable position and a buckling blocking position by means of the actuating device 30. The actuating device 30 comprises a drive device 40, a blocking element 50 and a spring unit 60. The drive device 40 is preferably a linear drive with a pneumatic cylinder 42 as a displaceable cylinder. The pneumatic cylinder 42 is fastened to the first support structure element 12 by means of two fastening elements 46 and 47. For this purpose, an end region of the pneumatic cylinder 42 is fixedly fastened to the third support structure element 19 by means of the fastening element which comprises a clamp which engages around the third support structure element 19. In the front region, the pneumatic cylinder 42 is fastened by means of a screw as a fastening element 47 to the first support structure element 12. The pneumatic cylinder 42 is preferably a double-acting pneumatic cylinder which has a connection and two lines for the supply and/or discharge of a fluid medium for the actuation of the pneumatic cylinder (not illustrated).

Furthermore, the actuating device 30 comprises the blocking element 50 which can be placed into an enable position in order to enable the buckling mechanism 20 and can be placed into a blocking position in order to block the buckling mechanism 20. In the situation shown in FIGS. 2 to 6, the blocking element 50 is situated in the blocking position and the buckling mechanism 20 is situated in its buckling blocking position. The blocking element 50 comprises a displaceable sleeve 52 which surrounds the first end 13 of the first support structure element 12 and, in the blocking position, at least partially also surrounds the first end 17 of the second support structure element 16. The sleeve 52 is operatively coupled to the drive device 40. For this purpose, the sleeve 52 has a connection in the form of a projection 54 with an opening 56. An end of the piston rod 43 of the pneumatic cylinder 42 engages into the opening 56 and is fixedly connected thereto. In this way, by means of a stroke movement of the piston rod 43, the sleeve 52 can be moved along the stroke travel, and therefore parallel to the longitudinal axis L, in order to be able to move the blocking element 50 from the enable position into the blocking position and vice versa, and thereby move the buckling mechanism 20 into the buckling enable position and the buckling blocking position and vice versa.

Finally, the actuating device 30 comprises a spring unit 60 which preloads the blocking element 50 in the blocking position. For this purpose, the spring unit 60 comprises a spring 62, in particular a spiral spring, and a stop 64. The spring 62 is supported against said stop 64 and, owing to its preload, presses the sleeve 52 in a direction away from the stop 64. When the spring 62 is in the relaxed state, the sleeve 52 is situated in the blocking position. To move the sleeve 52 and therefore the blocking element 50 from the blocking position into the enable position, the pneumatic cylinder 42 is actuated in order to displace the sleeve 52 by means of the piston rod 43 counter to the preload of the spring 62. The actuation of the pneumatic cylinder 42 may be effected by means of a controller which supplies compressed air via a line and a port. The controller may be actuated in a remote-controlled manner by an operator.

As an alternative to the embodiment shown, a design without the spring unit 60 is also possible, wherein then the drive device 40 is designed such that the blocking element 50 can be moved in two directions.

FIGS. 2 to 4 furthermore show the lifting mechanism 70 already mentioned above, said lifting mechanism having a pneumatic cylinder 72, a knee lever 73, a support frame 74 and an alignment body 75. In this regard, we refer to the European patent 1 519 100 B1 and hereby incorporate the relevant technical teaching disclosed in said document into the content of the present disclosure. In said document, it is provided in particular that the lifting mechanism 70 has a pneumatic cylinder 72 and, at both sides of the support structure element 16, a knee lever 73. Fastened to the free end of the knee lever 73 is a support frame 74 which bears a preferably annular alignment body 75. In this way, the alignment body 75 is movable substantially perpendicular to the longitudinal axis L. If the pneumatic cylinder 72 is acted on with pressure, the alignment body 75 is moved upward by means of the lifting mechanism 70 until the alignment body 75 is situated in the orifice region of the lateral pipe 152. Furthermore, a spring means is provided which presses the alignment body 75 in an elastically resilient manner in the direction of the orifice of the lateral pipe 152 and permits a displacement of the alignment body 75 until it latches in the orifice of the lateral pipe 152. If the alignment body 75 is not situated exactly with respect to the orifice of the lateral pipe 152 and bears against an edge of the main pipe 150, the alignment body 75 can, after a displacement and/or rotation of the rehabilitation device, slide or be pressed into the orifice of the lateral pipe 152 owing to the resilient pressing force.

As can be seen in particular from FIGS. 2 and 3, a connection device denoted as a whole by the reference numeral 80 is connected to the third support structure element 19. Said connection device 80 comprises a connection element 81 in the form of a hollow cylinder with a central opening 82, a guide element 84, a support element 86 and an end-side connection 88. The support element 86 and the connection 88 are likewise of hollow cylindrical form and have in each case one central opening. The central openings of the connection element 81, support element 86 and connection 88 are of approximately equal size and, together with the guide element 84, form a passage. In particular in the case of a situation in which it is sought to provide a relatively long section of a lateral pipe 152 with a correspondingly long lateral pipe portion 174 of the lining element 170, said passage serves to ensure that the then likewise relatively long lateral pipe calibration hose 164 can be introduced together with the lateral pipe portion 174, before the introduction of the rehabilitation device into the pipeline system, via said passage into a carrier hose (not illustrated) connected to the connection 88. When the lateral pipe portion 174 together with the lateral pipe calibration hose 164 is then introduced, during the rehabilitation process, into the lateral pipe 152, the unit composed of lateral pipe calibration hose 164 and lateral pipe portion 174 can be guided out of the carrier hose via the passage and the guide element 84 in the direction of the orifice of the lateral pipe 152. A further advantage of the design of the connection device 80 consists in that the support element 86 can be utilized for supporting the travelling unit 87. It is thus made possible to realize a compact connection device 80.

On the opposite side of the rehabilitation device, a connection device 90 is fastened to the second support structure element 16. Said connection device 90 has a cylindrical form. Provided adjacent to the connection device 90 is the rotary drive 100 which serves in particular to be able to rotate the rehabilitation device about the longitudinal axis L, such that the alignment body 75 can be introduced, in the region of the lateral pipe connection, into the orifice region by means of the lifting mechanism 70. The camera 110 is provided to be able to carry out a visual inspection.

As can be seen from FIG. 1, the connection element 81 and the connection device 90 serve for the air-tight fastening of the calibration hose 160 to the rehabilitation device. For this purpose, the ends of the calibration hose 160 are placed onto the outer circumferential surface of the connection element 81 and connection device 90 and fastened in an air-tight manner by means of clips, adhesive tape or the like.

Finally, FIGS. 1 to 4 show the travelling unit 120 already mentioned in the introduction, said travelling unit being fastened to the support structure 10. Both the travelling unit 120 and also the travelling unit 87 are adjustable such that they can be adapted to different pipe diameters.

LIST OF REFERENCE SYMBOLS

10 Support structure
12 First support structure element
13 First end

14 Second end
16 Second support structure element
17 First end
18 Second end
19 Third support structure element
20 Buckling mechanism
22 Groove
24 Tongue
26 Bolt
28 Opening
30 Actuating device
40 Drive device
42 Pneumatic cylinder
43 Piston rod
46 Fastening element
47 Fastening element
50 Blocking element
52 Sleeve
54 Projection
56 Opening
60 Spring unit
62 Spring
64 Stop
70 Lifting mechanism
72 Pneumatic cylinder
73 Knee lever
74 Support frame
75 Alignment body
80 Connection device
81 Connection element
82 Opening
84 Guide element
86 Support element
87 Travelling unit
88 Connection
90 Connection device
100 Rotary drive
110 Camera
120 Travelling unit
150 Main pipe
152 Lateral pipe
160 Calibration hose
162 Main pipe calibration hose
164 Lateral pipe calibration hose
170 Lining element
172 Main pipe portion
174 Lateral pipe portion
L Longitudinal axis

The invention claimed is:

1. Device for rehabilitating pipelines, the device having a support structure to which functional units of the device can be fastened, wherein the support structure has at least two support structure elements which are connected to one another via at least one buckling mechanism, and wherein by means of the buckling mechanism at least one support structure element can be placed into a buckled position, and an actuating device operative to selectively place the buckling mechanism into one of a buckling enable position and a buckling blocking position, wherein, in the buckling blocking position, a blocking element engages the buckling mechanism to prevent placement of the at least one support structure element into the buckled position, and wherein further the actuating device comprises a drive device operative to move the blocking element from the buckling blocking position so as to place the buckling mechanism in the buckling enable position.

2. Device according to claim 1, wherein the drive device has a linear drive.

3. Device according to claim 1, wherein the drive device comprises a pneumatic, hydraulic, electric and/or magnet-operated drive.

4. Device according to claim 1, wherein the drive device comprises a displaceable cylinder, in particular a pneumatic cylinder or a hydraulic cylinder.

5. Device according to claim 1, wherein the drive device has a connection and at least one line for the supply and/or discharge of a fluid medium.

6. Device according to claim 1, wherein the blocking element comprises a displaceable sleeve which overlies the buckling mechanism in the buckling blocking position.

7. Device according to claim 6, wherein the blocking element is operatively coupled to the drive device.

8. Device according to claim 7, wherein the actuating device comprises a spring unit which preloads the blocking element into the buckling blocking position.

9. Device according to claim 1, wherein a first end of a first support structure element has a groove and a first end of a second support structure element has a tongue, and the groove and tongue are rotatably connected to one another by means of a bolt so as to form the buckling mechanism.

10. Device according to claim 1, wherein the support structure elements are bar elements.

11. Device for rehabilitating pipelines, the device having:
a support structure to which functional units of the device can be fastened, wherein the support structure has at least two support structure elements which are connected to one another via at least one buckling mechanism, and wherein by means of the buckling mechanism at least one support structure element can be placed into a buckled position;
an actuating device operative to selectively place the buckling mechanism into one of a buckling enable position and a buckling blocking position, wherein, in the buckling blocking position, a blocking element engages the buckling mechanism to prevent placement of the at least one support structure element into the buckled position, and wherein further the actuating device comprises a drive device operative to move the blocking element from the buckling blocking position so as to place the buckling mechanism in the buckling enable position; and
wherein the blocking element comprises a displaceable sleeve which overlies the buckling mechanism in the buckling blocking position.

12. Device according to claim 11, wherein the blocking element is operatively coupled to the drive device.

13. Device according to claim 12, wherein the actuating device comprises a spring unit which preloads the blocking element into the buckling Mocking position.

14. Device according to claim 11, wherein a first end of a first support structure element has a groove and a first end of a second support structure element has a tongue, and the groove and tongue are rotatably connected to one another by means of a bolt so as to form the buckling mechanism.

* * * * *